June 24, 1947. R. D. KELL ET AL 2,422,971
HEAT RESPONSIVE INDICATOR
Filed Dec. 29, 1942 2 Sheets-Sheet 1
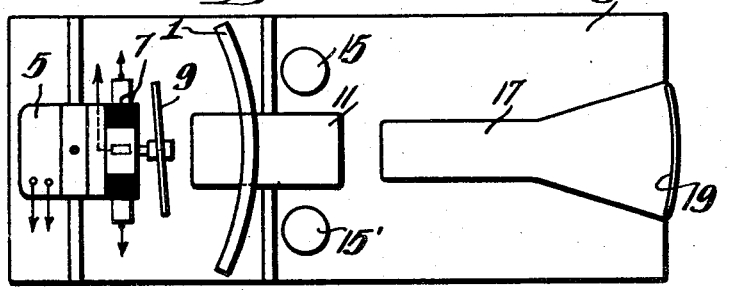
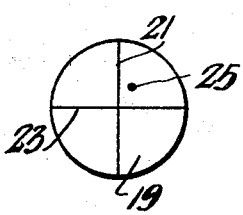
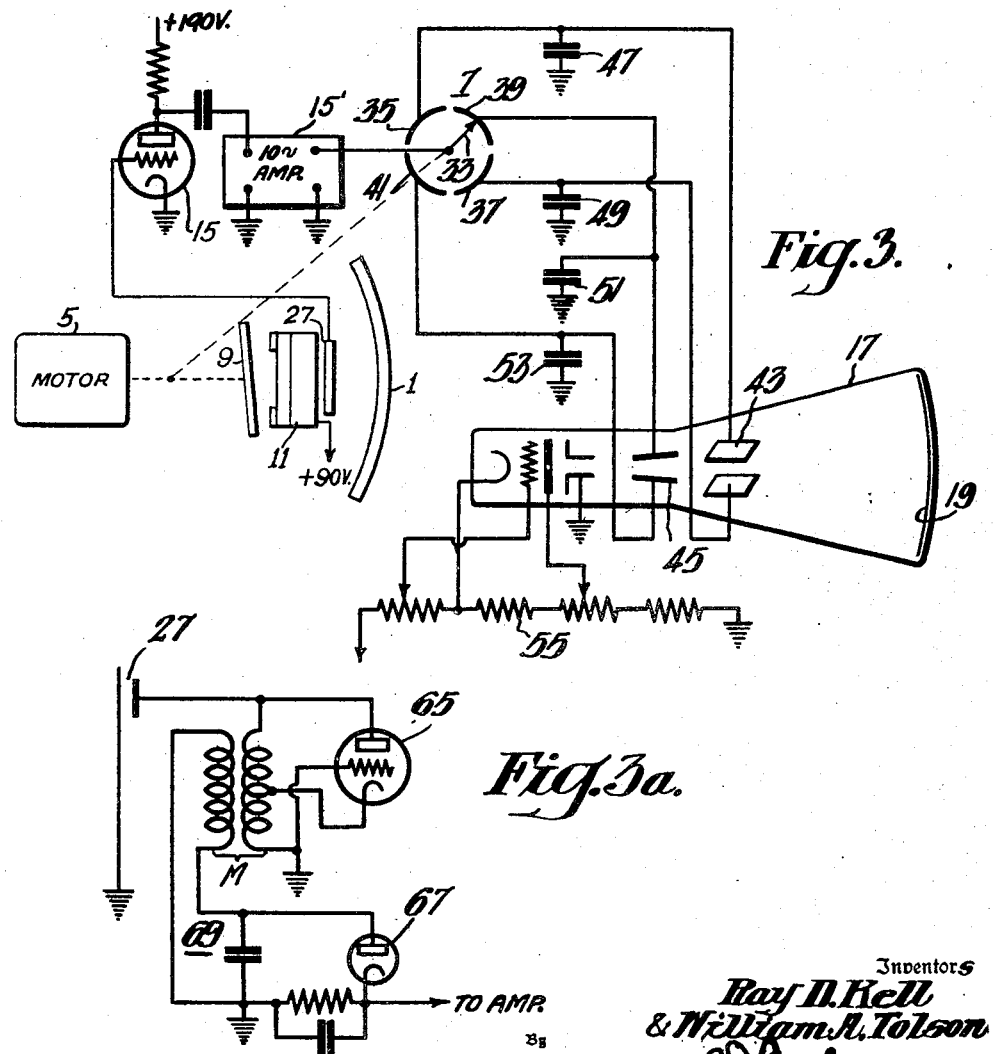
Inventors
Ray D. Kell
& William A. Tolson
Attorney June 24, 1947.  R. D. KELL ET AL  2,422,971
HEAT RESPONSIVE INDICATOR
Filed Dec. 29, 1942   2 Sheets-Sheet 2
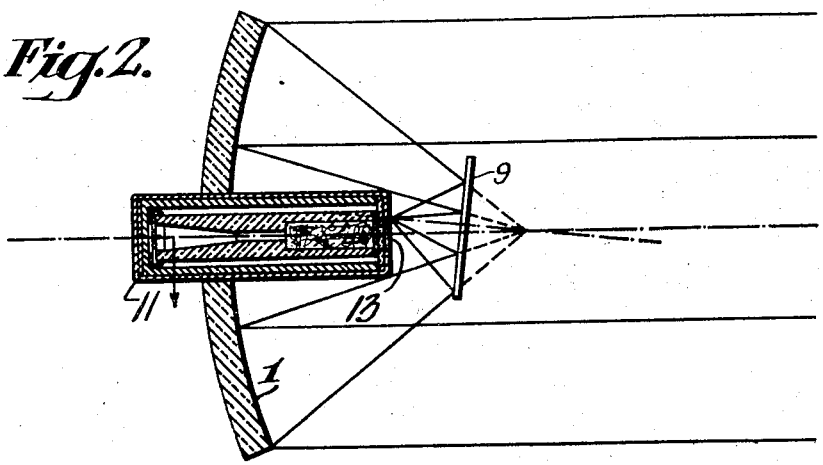
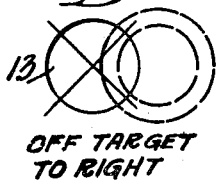
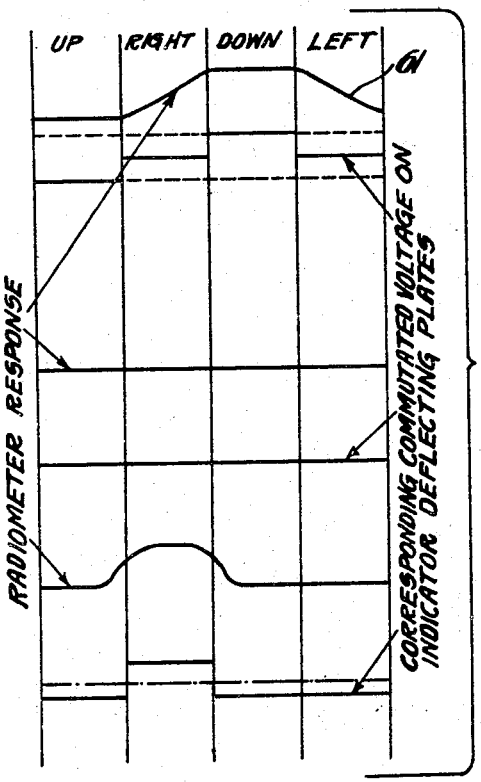
Inventors
Ray D. Kell
& William R. Tolson Patented June 24, 1947

2,422,971

UNITED STATES PATENT OFFICE 2,422,971

HEAT RESPONSIVE INDICATOR

Ray D. Kell and William A. Tolson, Princeton, N. J., assignors to Radio Corporation of America, a corporation of Delaware Application December 29, 1942, Serial No. 470,520

13 Claims. (Cl. 250—11)

This invention relates to heat responsive indicators and especially to a heat responsive device for indicating the position of a target such as a chimney or smoke stack radiating heat waves.

The prior art has disclosed heat responsive detectors which produce output currents as a function of input heat waves and indicate in a general way the direction of a source of radiant heat. The prior art has also disclosed a system which not only indicates the invisible heat radiating body but which also forms a visible image of the invisible body. Both the detector and the system are described in Wolff Patent 2,234,328, which issued March 11, 1941, for Radiant energy receiving device.

While the prior art devices detect the existence of a heat radiating body and its approximate direction, the instant invention produces a much more accurate indication of the bearing of the detected body by forming an image which is located with respect to cross hairs or reference lines. Thus the image may be located above or below or to the right or left of the intersection of the reference lines. The device is aligned initially so that the intersection of the reference lines corresponds to the target upon which the device is focused. Thereafter the device may be focused upon any heat radiating target by changing the direction of the device until the image falls on the intersection of the reference lines.

One of the objects of the instant invention is to provide an improved means for detecting a heat radiating body. Another object is to provide means for detecting and for locating accurately a heat radiating body. Another object is to provide an improved means for receiving radiant energy from a body and for forming an image corresponding to the body whereby the location of the image with respect to reference lines indicates a corresponding location of the body. An additional object is to provide an improved means for indicating the location of a body by detecting the quadrant in which radiant energy from the body impinges.

The invention will be described by referring to the accompanying drawings, in which Figure 1 is a schematic representation of one embodiment of the invention; Figure 1a is an end view of one form of indicator employed in the invention; Figure 2 is a sectional view of the heat reflecting and heat detecting elements; Figure 3 is a schematic circuit diagram of the invention; Figure 3a is a diagram of a modification of the circuit; Figures 4a, 4b and 4c are elevational views showing the relation of the image to the aperture of the heat detector; and Figure 5 is a graph showing the voltages produced by the radiations received from differently aligned targets. Similar reference characters indicate similar elements in the drawings.

Referring to Fig. 1, a curved reflector 1 is mounted on a base board 3. The base board also supports a motor 5 which is arranged to drive in synchronism a commutator 7 and a reflector 9. The reflector 9 is mounted at an angle so that it wobbles with respect to the driving shaft, for purposes hereinafter described. The wobbling reflector 9 is disposed near the curved reflector 1, as is shown in greater detail in Fig. 2. A heat responsive detector 11 is located at the focus of the curved reflector 1 and is provided with an aperture 13. The heat detector 11 may be of the type shown in Fig. 3 of Irving Wolff's U. S. Patent 2,234,328 for "Radiant energy receiving device." In the heat detector of the Wolff patent radiant energy passes through a heat transmitting diaphragm to a finely divided carbonaceous material. The material, upon being heated, gives off a gas, which expands and applies pressure to a diaphragm. The diaphragm forms one element of a capacitor whereby movements of the diaphragm vary the space between it and the other element thus to vary the capacity. The capacitor, being charged to a suitable potential, is a source of an output dependent upon the applied heat. The output of the heat detector is a variable current or a current whose phase is related to the angular position of the wobbling reflector. The variable current is applied to amplifying means 15 and 15'. The amplified output of the heat detector is applied, by means of the commutator 7, to the deflecting elements of the cathode ray tube 17.

The screen of the cathode ray tube preferably includes, in addition to the usual fluorescent screen 19, a pair of intersecting reference lines 21, 23. The intersection of the reference lines corresponds to the source of radiant energy to be detected. The energy is received, converted, amplified and applied to the cathode ray tube to produce a deflection of a spot 25 whose location, with respect to the reference lines, corresponds to the location of the radiant energy source.

The schematic circuit diagram of the foregoing arrangement is shown in Fig. 3. The heat detecting device 11 includes a capacitor element 27 and a suitable source of current indicated as +90 v. The capacitor is connected to a thermionic amplifier 15. The output of the thermionic amplifier is impressed upon an audio frequency amplifier 15'. The output of the audio frequency amplifier is applied to the moving electrode 33 of the commutator 7. The commutator consists of four segments, 35, 37, 39, 41. The diagonally opposite segments 35, 37 are connected to the horizontal deflecting electrodes 43, while the other pair of commutator segments 39, 41 is connected to the vertical deflecting electrodes 45. Each of the commutator segment connections includes a storage capacitor 47, 49, 51, 53. The cathode ray tube elements are suitably biased by connections to a potentiometer 55 which, in turn, is connected to a power source, not shown.

The mode of operation will be described by reference to Figs. 4a, 4b, 4c and 5. If the source of radiant energy lies along the longitudinal axis of the reflector, the received radiant energy will be focused on the inner portion of the aperture 13 and will follow a circular path 57 which is symmetrical with respect to time, as shown in Fig. 4b. Since this represents a steady state, there will be no variation in the capacitor element 27 of the heat detector 11, and hence no deflecting voltage will be applied through the amplifiers 15 and 15' and the commutator 7 to the cathode ray tube.

If, however, the source of radiant energy is slightly above the longitudinal axis of the heat detector and reflector, the circular path 59 will be eccentric with respect to the aperture 13, and will fall partly outside of the boundary of the aperture. Effectively, the path varies with respect to time, so that the capacity of the capacitor element 27 will vary in a corresponding manner. This will, in turn, cause a variable potential to be applied to the commutator as indicated by the graph line 61 of Fig. 5. This potential will charge the storage capacitors 47, 49, 51, 53 to different values, as indicated in Fig. 5. The resultant potentials applied to the deflecting elements of the cathode ray tube will cause the cathode ray beam to be impinged above the reference line 23 and in line with the reference line 21 for the condition represented in Fig. 4a.

In the event that the system is focused off the target to the right, as shown in Fig. 4c, a greater charge will be applied through the commutator 35 to the corresponding storage capacitor 47, and hence the cathode ray spot will be deflected to the right of the reference line, thereby indicating that the device is focused off the target to the right.

In the event that greater sensitivity is required, the modification shown in Fig. 3a may be employed. This modification utilizes an oscillator 65 which is connected to the capacitor element 27. As the capacity of the element 27 varies, the frequency of the oscillator will be varied. A suitable discriminator 67 is coupled to the oscillator 65 as shown. The discriminator is made responsive by detuning its resonant circuit 69, as is well known to those skilled in the art. The output of the discriminator may be further amplified and subsequently applied through the commutator to the cathode ray tube.

Thus the invention has been described as a heat detecting device which is provided with focusing means whereby radiant energy is focused on the aperture of a heat detecting tube. Variations in the bearing of the source of radiant energy produce variations in the point of application of the energy to the heat detector. These variations, in turn, vary the capacity of the heat detecting element, and hence its output. The current variations may be amplified and applied successively to a cathode ray tube or its equivalent to indicate the bearing of the energy with respect to the longitudinal axis of the device.

We claim as our invention:

1. A heat responsive device including a heat responsive detector, means for applying to said detector heat waves from an object to be indicated, means for varying the application of said heat waves to said detector for generating electric currents having a phase dependent upon the relation of the effective axial reference line of said detector and the line from said detector through said object, and an indicator responsive to said currents for indicating the relation of said reference line and said line through said object.

2. A heat responsive device for indicating the bearing of a source of heat waves including a heat responsive detector, means for focusing said heat waves upon said detector, means for varying the application of said heat waves to said detector for establishing electric currents having a phase dependent upon the bearing of said source with respect to the effective axial reference line of said detector, and an indicator responsive to said currents for indicating the bearing of said object with respect to said reference lines as a function of said phase.

3. A heat responsive device for indicating the bearing of a source of radiant energy including in combination a radiant energy responsive detector, a member including an aperture effectively disposed between said detector and said source, means for focusing said energy on said aperture, means for rotating said focused energy in a path substantially concentric with said aperture whereby changes in said focusing direct said rotating energy in a path eccentric with respect to said aperture, means including said detector for deriving an electric current having an instantaneous magnitude proportional to the maximum eccentricity of said path, and an indicator effectively connected to said detector for indicating the magnitude of said current as a function of the eccentricity of said path.

4. A heat responsive device for indicating the bearing of a source of radiant energy, with respect to predetermined reference planes, including in combination a radiant energy responsive detector, a member including an aperture effectively disposed between said detector and said source, means for focusing said energy on said aperture, means for rotating said focused energy in a path substantially concentric with said aperture whereby changes in said focusing direct said rotating energy in a path eccentric with respect to said aperture, means including said detector for deriving an electric current having an instantaneous magnitude proportional to the maximum eccentricity of said path, and an indicator effectively connected to said detector for indicating the magnitude of said current as a function of the eccentricity of said path, said indicator including reference lines corresponding to said predetermined reference planes.

5. A heat responsive device for indicating the bearing of a source of radiant energy including in combination a radiant energy element for converting applied radiant energy into electric currents, means for focusing said energy upon said element, means for varying the amount of applied energy as a function of the bearing of said source with respect to a predetermined reference line whereby said electric currents vary in magnitude as the bearing varies, a plurality of electric storage devices, means for successively charging said storage devices by applying thereto said currents, and a cathode ray indicator connected to said storage devices for indicating the bearing of said source as a function of the charges applied to said storage devices.

6. A heat responsive device for indicating the bearing of a source of radiant energy including in combination a radiant energy detector including an aperture and means for converting said energy into electric currents, a reflector for concentrating energy from said source upon said aperture, means for deflecting said concentrated energy in a path substantially concentrically disposed within the boundary of said aperture whereby eccentric movements deflect said energy outside of said aperture and produce variations in the output currents of said detector, a commutator connected to said detector to receive output currents therefrom, means for driving said commutator and said deflecting means in synchronism, a plurality of storage devices connected to said commutator, and a cathode ray tube including deflecting elements connected to said storage devices and arranged to deflect said cathode ray as a function of the charges stored in said storage devices.

7. A heat responsive device for indicating the bearing of a source of radiant energy including in combination a radiant energy detector including an aperture and means for converting said energy into electric currents, a reflector for concentrating energy from said source upon said aperture, means for deflecting said concentrated energy in a path substantially concentrically disposed within the boundary of said aperture whereby eccentric movements deflect said energy outside of said aperture and produce variations in the output currents of said detector, a commutator connected to said detector to receive output currents therefrom, means for driving said commutator and said deflecting means in synchronism, four capacitors connected to said commutator, and a cathode ray tube including deflecting elements connected to said capacitors and arranged to deflect said cathode ray as a function of the charges stored in said capacitors.

8. A heat responsive device for indicating the bearing of a source of radiant energy including in combination a radiant energy detector including an aperture and means for converting said energy into electric currents, a first reflector for concentrating energy from said source upon said aperture, an eccentrically mounted reflector disposed between said aperture and said first reflector for deflecting said concentrated energy in a path substantially concentrically disposed within the boundary of said aperture whereby eccentric movements deflect said energy outside of said aperture and produce variations in the output currents of said detector, a commutator connected to said detector to receive output currents therefrom, means for driving said commutator and said deflecting means in synchronism, four capacitors connected to said commutator, and a cathode ray tube including deflecting elements connected to said capacitors and arranged to deflect said cathode ray as a function of the charges stored in said capacitors.

9. A heat responsive device including a heat responsive detector, means for applying to said detector heat waves from an object to be indicated, means including said detector for generating electric currents having a phase dependent upon the relation of the effective axial reference line of said detector and the line from said detector through said object, an oscillator, means for applying said currents to said oscillator to vary its frequency, means for detecting said frequency varying currents, and an indicator responsive to said detected currents for indicating the relation of said reference line and said line through said object.

10. A heat responsive device for indicating the bearing of a source of radiant energy including in combination a radiant energy responsive detector, a member including an aperture effectively disposed between said detector and said source, means for focusing said energy on said aperture, means for rotating said focused energy in a path substantially concentric with said aperture whereby changes in said focusing direct said rotating energy in a path eccentric with respect to said aperture, means including said detector for deriving an electric current having an instantaneous magnitude proportional to the maximum eccentricity of said path, an oscillator, means for applying said derived electric current to said oscillator to vary its frequency, means for detecting said frequency variations, and an indicator effectively connected to said frequency detecting means for indicating the magnitude of said current as a function of the eccentricity of said path.

11. A heat responsive device including a heat responsive detector, means for applying to said detector heat waves from an object to be indicated, a reactive element, means including said detector for varying said reactive element to produce an effect having a phase dependent upon the relation of the effective axial reference line of said detector and the line from said detector through said object, an oscillator, means for impressing said varying reactance upon said oscillator to vary its frequency means for detecting said frequency varying currents, and an indicator responsive to said detected currents for indicating the relation of said reference line and said line through said object.

12. A heat responsive device for indicating the bearing of a source of radiant energy including in combination a radiant energy responsive detector, a member including an aperture effectively disposed between said detector and said source, means for focusing said energy on said aperture, means for rotating said focused energy in a path substantially concentric with said aperture whereby changes in said focusing direct said rotating energy in a path concentric with respect to said aperture, a reactive element, means including said detector for varying said reactive element to produce an effect having an instantaneous magnitude proportional to the maximum eccentricity of said path, an oscillator, means for impressing said varying reactance upon said oscillator to vary its frequency, means for detecting said frequency variations, and an indicator effectively connected to said frequency detecting means for indicating the magnitude of said effect as a function of the eccentricity of said path.

13. A heat responsive device including a heat responsive detector, means for applying to said detector heat waves from an object to be indicated, means including said detector for producing a capacity variation, an oscillator, means for applying said capacity variation to said oscillator to vary its frequency, means for converting said frequency variation into a current of varying amplitude, said varying amplitude having a phase dependent upon the relation of the effective axial reference line of said detector and the line from said detector through said object, means for detecting said frequency varying currents, and an indicator responsive to said detected currents for indicating the relation of said reference line and said line through said object.

RAY D. KELL.
WILLIAM A. TOLSON.

REFERENCES CITED

The following references are of record in the file of this patent:

UNITED STATES PATENTS

| Number | Name | Date |
|---|---|---|
| 2,121,771 | Jones | June 21, 1938 |
| 2,237,193 | Mobsby | Apr. 1, 1941 |

FOREIGN PATENTS

| Number | Country | Date |
|---|---|---|
| 542,634 | Great Britain | Jan. 21, 1942 |